April 3, 1934.  A. D. PENTZ  1,953,258
SELF ENERGIZING BRAKE
Filed March 4, 1930  2 Sheets-Sheet 1
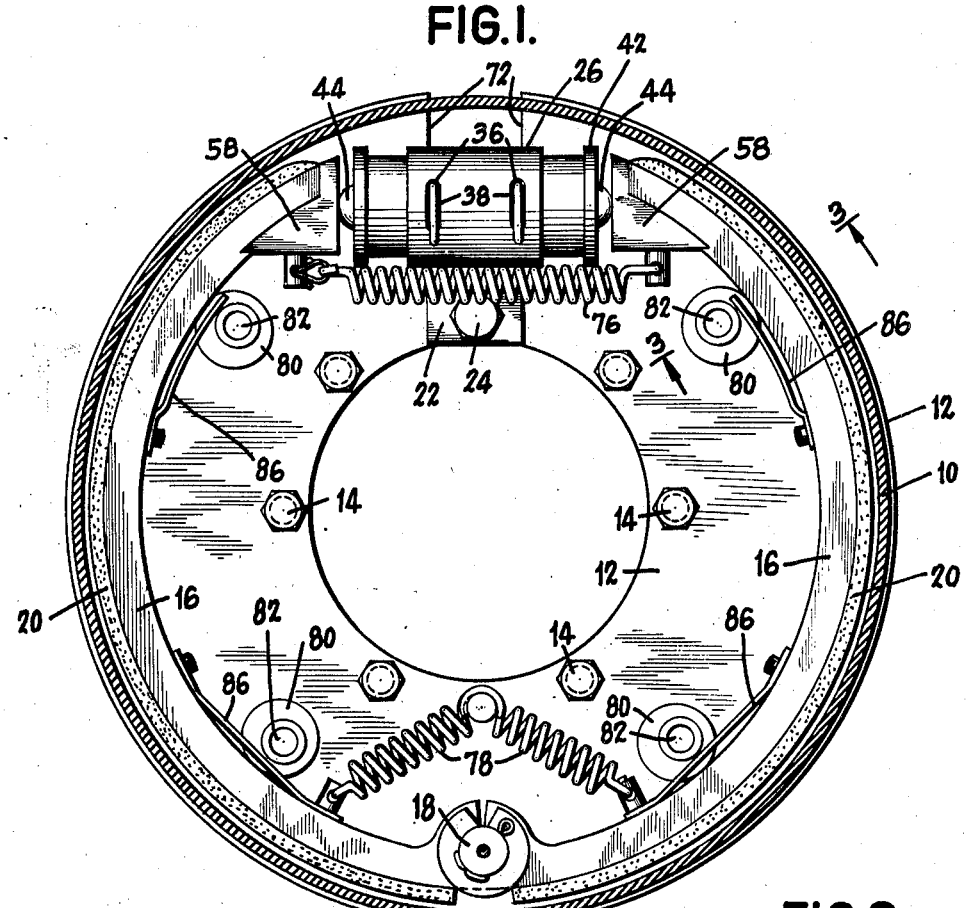
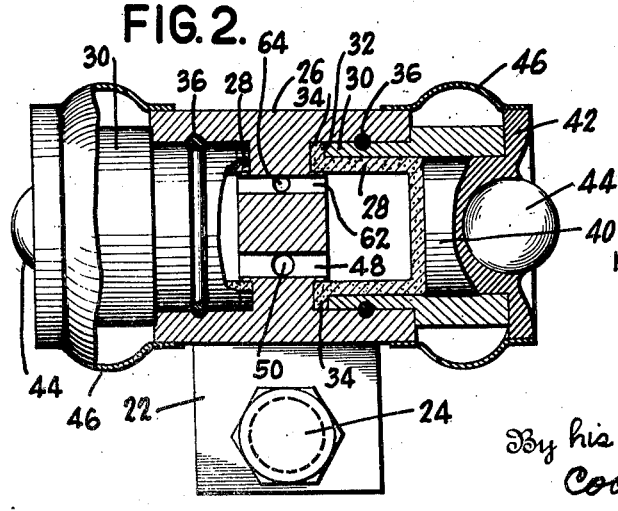
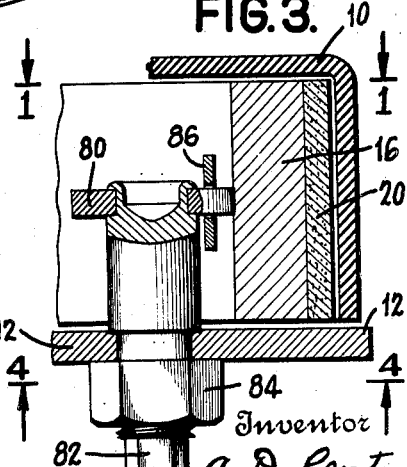

April 3, 1934.    A. D. PENTZ    1,953,258
SELF ENERGIZING BRAKE
Filed March 4, 1930    2 Sheets-Sheet 2
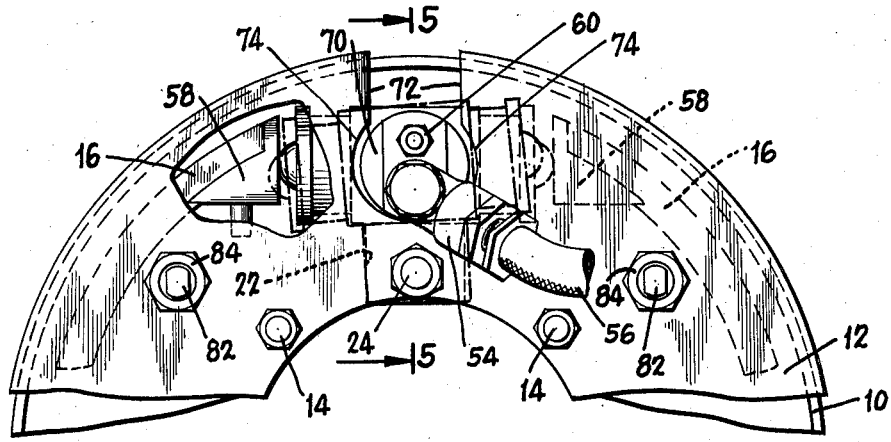
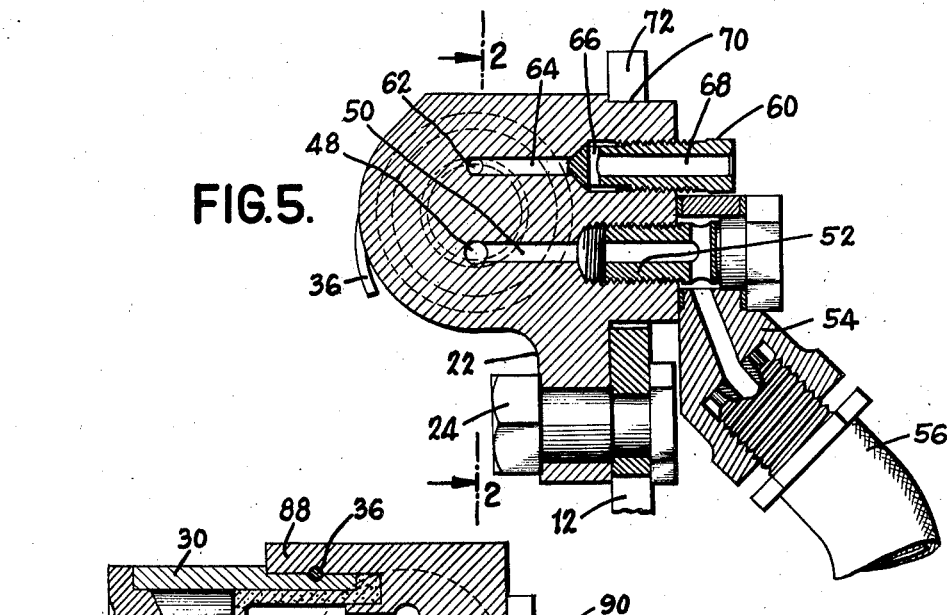
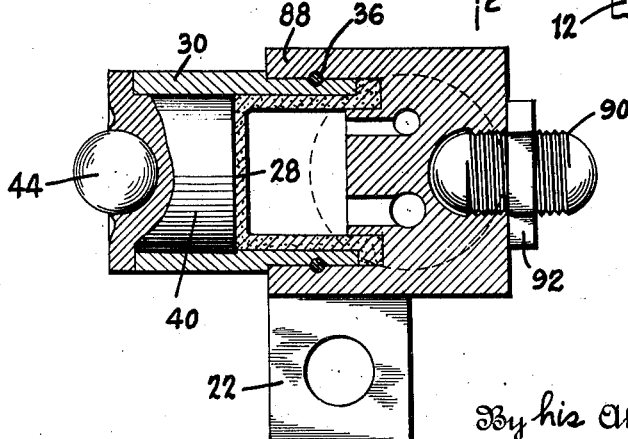

Patented Apr. 3, 1934

1,953,258

UNITED STATES PATENT OFFICE 1,953,258

SELF-ENERGIZING BRAKE

Albert D. Pentz, New Brighton, N. Y., assignor to Pentz Motor Brake Corporation, New Brighton, N. Y., a corporation of New York Application March 4, 1930, Serial No. 433,001

9 Claims. (Cl. 188—152)

The object of this invention is to disclose an improved type of self-energizing vehicle brake in which a brake shoe is used in connection with a rigid but shiftable member in such a manner that the point or anchorage of the shoe is at the forward end of the shiftable member regardless of the direction of rotation of the brake drum. Furthermore, the point of anchorage is always well in advance of the forward end of the shoe itself.

Another object is to provide a brake which will be cheap to manufacture, and easy to keep in operative condition. The brake may be operated by cams or other mechanical devices, but I prefer to operate it hydraulically.

Further and other objects and advantages will appear from the specification and claims, and from the drawings which show by way of illustration what is now considered the preferred embodiment of the invention.

Fig. 1 is a side view of the invention, with the drum in section, on the line 1—1 of Fig. 3.

Fig. 2 is a cross-section of the hydraulic actuating device, on the line 2—2 of Fig. 5.

Fig. 3 is a detail view, on the line 3—3 of Fig. 1.

Fig. 4 is a rear view of the upper part of Fig. 1, on the line 4—4 of Fig. 3.

Fig. 5 is a cross-section on the line 5—5 of Fig. 4.

Fig. 6 is a cross-section similar to Fig. 2 but showing a single acting hydraulic cylinder.

In the drawings, 10 is the brake drum designed for attachment to the vehicle wheel, while 12 is the stationary apron arranged for attachment by bolts 14 to the axle housing or other non-rotative part of the vehicle. Within the drum is the brake band, which may be of any desired type but is here shown as two shoes 16, hinged together by pin 18 and shod with friction material 20.

Between the upper ends of shoes 16 is a member 22 carrying the hydraulic actuating devices and mounted on apron 12 in such manner as to permit slight shifting of the unit parallel to the apron. Preferably attachment to the apron is by pivot pin 24, which permits rocking of the unit as indicated by broken lines in Fig. 4.

In Figs. 2 and 5 are shown details of the preferred form of actuating unit. It comprises a body member 26, counterbored at both ends to receive hat-shaped resilient members 28, and held in place by a sleeve 30, shouldered at 32 against 26 so as to compress rim 34 of the resilient member a predetermined amount. Sleeve 30 is retained in operative position by a locking wire 36 inserted in a passage turned partly in the sleeve and partly in body member 26. The ends of wires 36 protrude through slots 38 in the sides of member 26 so as to be easily inserted or removed.

Fitted in the outer ends of sleeves 30 in contact with resilient members 28 are pistons 40, their inward travel being limited by flanges 42 adapted to abut the ends of sleeves 30. Set into the outer end of each piston 40 is a thrust ball 44. Extending from flange 42 to the cylindrical end of body 26 is a grease retaining boot 46.

The interior of the hydraulic device is normally filled with oil and is connected through passages 48, 50, nipple 52 and fitting 54 to supply hose 56. Whenever, in the operation of the device, more oil is forced through the hose and passages into the resilient members 28 they force plungers 40 outwardly until balls 44, bearing against thrust blocks 58 fast on the upper ends of shoes 16, force shoes 16 into contact with drum 10.

Screw plug 60 serves to bleed the hydraulic device of any entrapped air, which escapes through passages 62, 64, 66 and 68 whenever plug 60 is loosened.

The rear portion of body 26 is in the form of a cylindrical boss 70 projecting through a slot 72 in the upper part of plate 12, the lower part of the slot being shaped at 74 to fit the circumference of boss 70. Thus the sides of slot 72 serve as stops to limit the travel of member 22 as it swings to right or left about its pivot 24.

If the drum is rotating and the shoe is forced into contact therewith as above described, the shoe will rotate with the drum, and unit 22 will rotate about pivot 24 until boss 70 contacts with one side or the other of slot 72, which will then serve as an anchor for the brake shoe. For instance, if the drum be rotating counterclockwise (Fig. 4) the assembly will take the position indicated by the dotted lines farthest to the left, with hub 70 against surface 74, which, therefore, is the anchor for the entire brake shoe. If the drum were rotating in the other direction, anchorage would be at the other surface 74.

As is well known in the brake art, whenever the shoe in an internal brake is applied it is self-actuating from the trailing end of the shoe to the point of anchorage of the shoe or band. With this in mind it will be apparent that the shoe in the present brake is self-actuating throughout its entire length because the point of anchorage is more than 360 degrees in advance of the trailing end of the band.

Whenever the brake is being applied, as above, the advancing shoe pushes inwardly the plunger 40 with which it comes in contact until movement of the plunger is stopped by flange 42 abutting sleeve 30. The oil displaced inwardly by that plunger simply moves to the other end of the unit thereby pushing out the other plunger a corresponding amount. When the brake is released, springs 76 and 78 restore the shoes to normal position against stop eccentrics 80 which are settable by studs 82 and nuts 84 outside apron 12. Slotted guides 86 fast to the shoes engage the sides of eccentric 80 to prevent undue sidewise movement of the shoes.

In place of the double acting hydraulic unit above described, a single acting unit may be used. Such a unit may be seen in Fig. 6. It is exactly similar to the double acting unit except that body 26 is replaced by a body 88, and one of the thrust systems is replaced by a ball-end screw 90 locked in position by nut 92.

It is to be understood that the invention is not limited to the specific embodiment herein illustrated and described but may be used in other ways without departure from its spirit as defined by the following claims.

I claim—

1. In a brake for a vehicle, a rotatable drum, a brake shoe within the drum, a stationary apron, hydraulic means including a cylinder carried by said apron and operable to apply said shoe to said drum, said hydraulic means being shiftable to anchor said shoe in advance of the forward end thereof when the brake is applied.

2. In a brake for a vehicle, in combination, a rotatable drum, a brake band within the drum, a member shiftable substantially circumferentially within the drum, means effective on said band and reacting on said member for forcing said band into contact with said drum, and means effective through said member for anchoring said band at the forward end thereof when the brake is applied, regardless of the direction of rotation of said drum.

3. In a brake for a vehicle, in combination, a rotatable drum, a brake band within the drum, a member shiftable substantially circumferentially within the drum, hydraulic devices mounted on said member and effective on said band for forcing said band into contact with said drum, and an anchor effective through said shiftable member to prevent rotation of said band with said drum when the brake is applied.

4. In a brake for a vehicle, in combination, a rotatable drum, a brake band within the drum, a member shiftable substantially circumferentially within the drum, an hydraulic device mounted at each end of said member and effective on said band at widely separated points for forcing said band into contact with said drum, and an anchor effective through said shiftable member to prevent rotation of said band with said drum when the brake is applied.

5. In a brake for a vehicle, in combination, a rotatable drum, a brake band within the drum, a shiftable member, anchor means adapted to engage said member, hydraulic devices adapted to react against said member for forcing said band into engagement with the said drum whereby said band rotates with said drum until the band through the instrumentality of one of said hydraulic devices forces said member against said anchor, substantially as described.

6. In a vehicle brake, in combination, a drum, a shoe within the drum, means including a cylinder and piston for forcing said shoe into contact with said drum, an anchor, and a member shiftable substantially circumferentially adapted for actuation by said shoe to engage said anchor, said forcing means being mounted on said shiftable member, substantially as described.

7. In a brake for a vehicle, in combination, a rotatable drum, a brake shoe within the drum, an hydraulic device including a cylinder and piston operable to apply said shoe to said drum, and a shiftable member effective to anchor said assembly at the forward end thereof when the brake is applied, said hydraulic device being mounted on said shiftable member, substantially as described.

8. In a brake for a vehicle, in combination, a rotatable drum, a brake shoe assembly within the drum, two anchors spaced from each other in the direction of drum rotation, a shiftable member movable relatively to said anchors, an hydraulic device including a cylinder and piston mounted on said shiftable member and operable to apply said shoe to said drum, said shiftable member being effective to engage one or the other of said anchors depending upon the direction of rotation of said drum.

9. In a brake for a vehicle, a rotatable drum, a brake shoe within the drum, a stationary apron, hydraulic means carried by said apron and operable to apply said shoe to said drum, said hydraulic means being pivotally supported on said apron to shift substantially circumferentially to anchor said shoe in advance of the forward end thereof when the brake is applied.

ALBERT D. PENTZ.